UNITED STATES PATENT OFFICE.

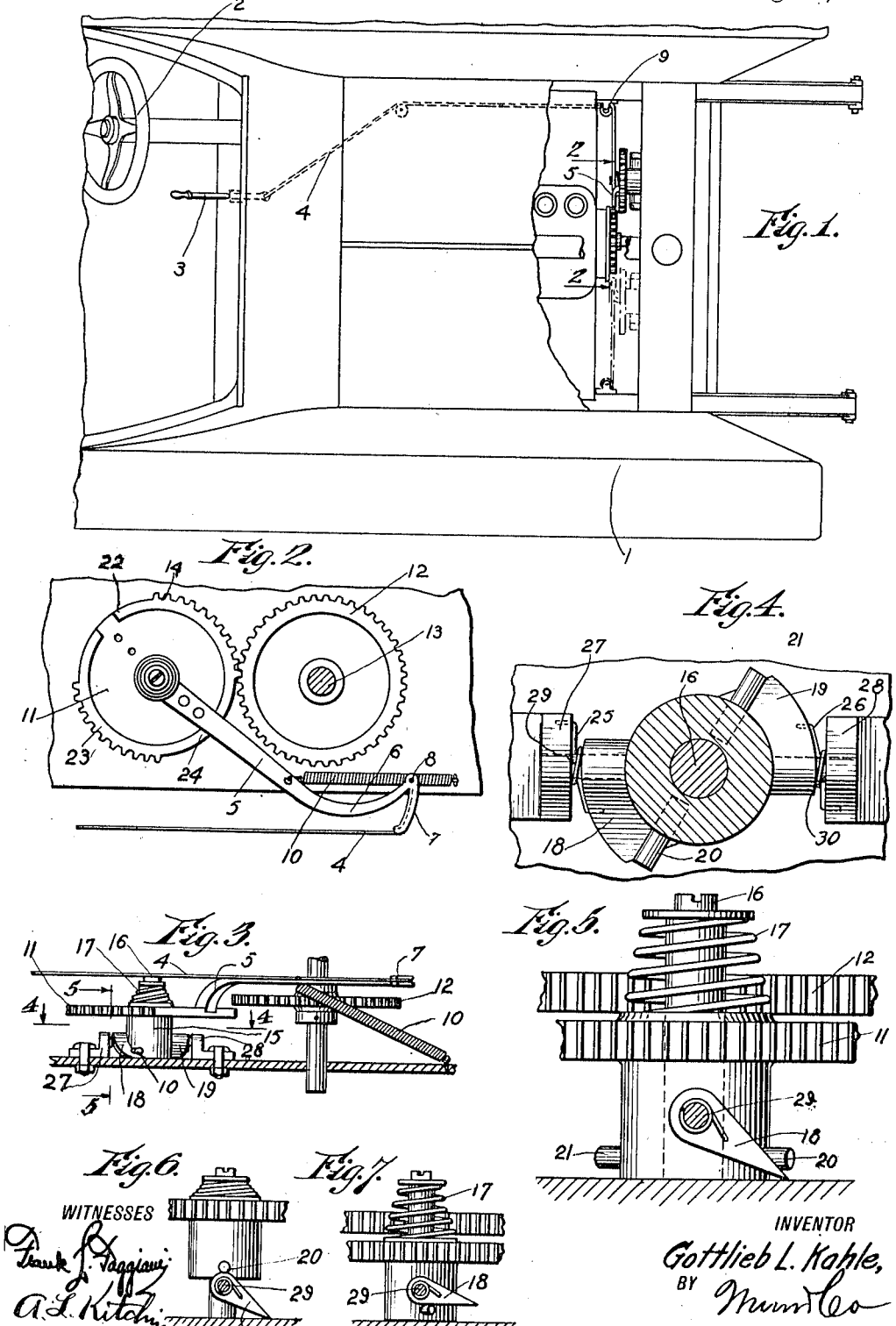

GOTTLIEB L. KAHLE, OF BOHEMIA, NEW YORK.

ENGINE-STARTER.

1,314,403.  Specification of Letters Patent.  Patented Aug. 26, 1919.

Application filed February 26, 1919. Serial No. 279,335.

*To all whom it may concern:*

Be it known that I, GOTTLIEB L. KAHLE, a citizen of the United States, and a resident of Bohemia, in the county of Suffolk and State of New York, have invented a new and Improved Engine-Starter, of which the following is a full, clear, and exact description.

This invention relates to starting devices for engines and has for an object the provision of an improved construction whereby mechanical means are used for turning over the engine from the driver's seat, or from any other convenient point.

Another object in view is to provide an engine starting means which may be applied on either side of the engine, and connected up by suitable cables to a manually operated member so that the engine may be readily turned over from a distant point.

A further object more specifically is the provision of an arrangement of gears and cams whereby when the engine is being turned over the cams will throw the gears into mesh and will automatically throw the gears out of mesh when the engine has been properly moved.

In the accompanying drawing:

Figure 1 is a fragmentary top plan view of the front part of an automobile with certain parts broken away for better illustrating an embodiment of the invention applied to the automobile.

Fig. 2 is an enlarged fragmentary sectional view through Fig. 1 on line 2—2.

Fig. 3 is an edge view of the structure shown in Fig. 2.

Fig. 4 is a sectional view through Fig. 3 on line 4—4, the same being on an enlarged scale.

Fig. 5 is an enlarged sectional view through Fig. 3 on line 5—5.

Fig. 6 is a fragmentary side view of the cam and associate parts showing the pin embodying certain features of the invention about to pass off the cam.

Fig. 7 is a view similar to Fig. 6, but disclosing the action of the cam during the return movement of the gears and associate parts.

Referring to the accompanying drawing by numerals, 1 indicates an automobile of any desired kind which is provided with any suitable form of steering wheel 2. Arranged adjacent the steering wheel 2 is a hand operated lever 3, which is pivotally mounted in any suitable manner and to which a cable 4 is connected, said cable passing through suitable pulleys to the arm 5, whereby said arm may be operated whenever desired from the driver's seat. This arm and associate parts are more fully shown in Figs. 2 and 3. Arm 5 is provided with a bent end 6 merging into an arc-shaped member 7 which accommodates the pin 8 to which the cable 4 is secured. This cable 4, which connects the lever 3 and member 7, may be passed around any number of pulleys 9. A spring 10 is used for returning the arm 5 to its former position and also the various parts connected therewith. The arm 5 is rigidly secured by rivets, bolts, or otherwise to a mutilated gear wheel 11, which gear wheel is designed to be brought into mesh at different times with the gear wheel 12. The gear wheel 12 is rigidly secured to the shaft 13 which is part of the crank shaft whereby whenever gear wheel 12 is operated sufficiently the engine is turned over for starting. The size of the gear wheel 12 may be the same as the mutilated gear wheel 11, or smaller, or larger as preferred, but the size must be properly proportioned to rotate the gear wheel 12 and shaft 13 sufficiently to turn over the engine while the set of teeth 14 on wheel 11 is in mesh with the gear wheel 12. Normally the wheel 11 remains offset from wheel 12, as for instance to one side the same as shown in Fig. 1, but when the cable 4 is operated and lever 5 operated, means hereinafter fully described will move the teeth 14 into mesh with the teeth of the gear wheel 12 and then rotate the wheel 11 for part of a turn, which by reason of the proper size of the wheel 12 will cause the engine to be properly turned over. If the engine does not start on the first turning over the action may be repeated.

The gear wheel 11 has a drum or hub 15 which is loosely mounted on the shaft 16 so as to freely slide thereon, spring 17 normally holding the wheel 11 and drum or hub 15 in a disengaged position. In order to move the gear wheel 11 against the action of spring 17 for bringing the teeth 14 into mesh with wheel 12 a pair of cams 18 and 19 are provided, said cams being acted upon by pins 20 and 21, which pins ride up the outer faces of the cams whereby the hub 15 and the wheel 11 carried thereby are both moved laterally until the teeth 14 are in mesh with wheel 12, and they remain in mesh until the smooth section 22 is reached. The parts are so proportioned that when the smooth section 22 reaches the gear wheel 12 the pins 20 and 21 move off the large end of the cams 18 and 19 as indicated in Fig. 6 and then move back again to their former position beneath the cams as indicated in Fig. 7.

The operation of the lever 3 causes the arm 5 to actuate the gear wheel 11 sufficiently far to move the pins 20 and 21 from the cams and spring 10 moves the parts back to their former position ready for a second action. This operation is repeated as often as may be desired. In all of these operations the section of teeth 23 is not brought into action, nor is the smooth section 24 utilized. These parts are utilized when the wheel 11 and associate parts are arranged on the right side of the engine instead of the left side as shown in Fig. 1, the action otherwise being identical. If desired the pins 20 and 21 could be solid or provided with rollers in order to reduce the friction. The gear wheels 11 and 12 are arranged in a vertical plane as shown in Fig. 1, but it will be evident that they could operate not only in this plane, but in a horizontal plane if desired. In order to insure proper action of the cams 18 and 19 springs 25 and 26 are provided, said springs having one end connected with the respective cams and the other to the supporting brackets 27 and 28 which act as supports for the journal pins 29 and 30.

What I claim is:

1. A starter for internal combustion engines comprising a gear wheel connected to the crank shaft of the engine, a second gear wheel arranged adjacent the first mentioned gear wheel, an arm for rotating the second mentioned gear wheel, and means for causing the lateral movement of said second mentioned gear wheel to mesh with the first mentioned gear wheel after it has moved for a certain distance and remain in mesh for a predetermined travel whereby the engine is turned over.

2. An engine starter of the character described comprising two gear wheels, one adapted to be secured to an engine drive shaft, a shaft parallel to the drive shaft and on which the other of said gears is mounted to slide and is normally out of mesh with the first-mentioned gear, a lever for moving the last-mentioned gear wheel for a part of a rotation, a pair of cam members acting on the last-mentioned gear wheel for causing the same to move into engagement with the first-mentioned gear wheel at the start of its movement, and a spring forcing the last-mentioned gear wheel out of mesh with the first-mentioned gear wheel at the end of the movement past the cams.

3. An engine starter for the internal combustion engine of an automobile comprising a gear wheel secured to the crank shaft of said engine, a shaft parallel with the crank shaft, a second gear wheel mounted on the last-mentioned shaft, means for causing said second gear wheel to move laterally into mesh with the first-mentioned gear wheel and then rotate sufficiently to cause a proper actuation of the gear wheel whereby the engine is turned over, said means including a swinging arm, a cable connected to the end of said arm and extending to near the driver's seat of the automobile, and a manually operated member for actuating said cable whereby the driver may turn the engine over whenever desired and as often as desired without leaving his seat.

4. An engine starter for automobile engines comprising a gear wheel secured to the crank shaft of the engine, an actuating gear wheel normally out of mesh with the first mentioned gear wheel, a pair of pivotally mounted cams, pins extending from the hub of said second mentioned gear wheel adapted to engage said cams and move said second mentioned gear wheel laterally so as to mesh with the first mentioned gear wheel when the second mentioned wheel is rotated a predetermined extent, a plurality of means for causing said pins to pass beneath said cams on the return movement after one operation of said second mentioned gear wheel, and means extending to a distant point for rotating to a predetermined extent said second mentioned gear wheel.

5. A starter for internal combustion engines comprising a gear wheel adapted to be secured to the crank shaft of the engine, a second gear wheel rotatably mounted on a fixed shaft, a spring for normally holding the second gear wheel offset from the first, a pair of projections or pins extending from the hub portion of said second gear wheel, a pair of pivotally mounted cams arranged adjacent said hub, a manually actuated arm for rotating said second gear wheel for part of a revolution whereby the pins will climb said cams and move the second gear wheel into mesh with the first mentioned gear wheel so as to rotate the first mentioned gear wheel to a certain extent, the rotation of the second gear wheel being sufficient to cause the pins to move off of the ends of said cams, a spring for causing said pins to move to a position below the ends of the cams, and a spring for returning said pins, said second gear wheel and associate parts to their starting point while the gear wheel is in an offset position in respect to the first mentioned gear wheel.

6. A starter for internal combustion engines comprising a gear wheel adapted to be secured to the crank shaft of an engine, a second gear wheel offset from the first, said second gear wheel being formed with a hub, a pair of outwardly extending pins projecting from said hub, a pair of cams coacting with the pins for moving the second gear wheel laterally and thereby causing the same to mesh with the first gear wheel, means for rotating said second gear wheel to cause the pins to act against the cam and also to cause the second gear wheel to rotate the first mentioned gear wheel, a spring for moving the second gear wheel laterally out of mesh with the first mentioned gear wheel when said pins have reached the end of said cams, and a second spring acting on said second gear wheel for returning the second gear wheel to its starting point, said pins passing beneath said cams during said return movement.

7. An internal combustion engine starter comprising a gear wheel secured to the crank shaft of said engine, a second gear wheel normally offset from the first mentioned gear wheel, means for rotating said second gear wheel, said means including an arm having a curved end, an arc-shaped member extending from the end, and a cable secured to the extreme end of the arm, said cable fitting in a groove in said arc-shaped member whereby the arm may be given an extra throw by a straight pull on the cable, and a cam construction acting on said second gear wheel for moving the same into mesh with said first mentioned gear wheel when the second gear wheel is rotated.

GOTTLIEB L. KAHLE.